United States Patent [19]

Reuter et al.

[11] 4,179,280

[45] Dec. 18, 1979

[54] DIRECT-REDUCTION PROCESS CARRIED OUT IN A ROTARY KILN

[75] Inventors: Gerhard Reuter, Frankfurt am Main; Wolfram Schnabel, Hattersheim; Harry Serbent, Hanau, all of Fed. Rep. of Germany

[73] Assignee: Metallgesellschaft Aktiengesellschaft, Frankfurt am Main, Fed. Rep. of Germany

[21] Appl. No.: 898,256

[22] Filed: Apr. 20, 1978

[30] Foreign Application Priority Data

Apr. 30, 1977 [DE] Fed. Rep. of Germany ....... 2719422

[51] Int. Cl.$^2$ ............................................. C21B 13/08
[52] U.S. Cl. ............................................. 75/33; 75/34
[58] Field of Search ...................................... 75/33–36

[56] References Cited

U.S. PATENT DOCUMENTS

| | | | |
|---|---|---|---|
| 3,170,786 | 2/1965 | Moklebust | 75/36 |
| 3,180,631 | 4/1965 | Moklebust | 75/36 |
| 3,206,299 | 9/1965 | Senior | 75/36 |
| 3,231,366 | 1/1966 | Schenck | 75/36 |
| 3,331,679 | 7/1967 | Schenck | 75/36 |
| 3,881,916 | 5/1975 | Serbent | 75/36 |

Primary Examiner—P. D. Rosenberg
Attorney, Agent, or Firm—Sprung, Felfe, Horn, Lynch & Kramer

[57] ABSTRACT

A process for directly reducing iron oxide-containing materials to provide sponge iron by heating said iron oxide-containing materials in a rotary kiln while employing a solid carbonaceous reducing agent having a high content of volatile combustible components, wherein oxygen-containing gases are injected into the rotary kiln at a controlled rate through shell pipes into the free kiln space and the charge is moved through the rotary kiln countercurrently to the flow of the kiln atmosphere, is described. The invention lies in injecting oxygen-containing gases at controlled rates through nozzle blocks into the charge disposed over said nozzle blocks and in injecting oxygen-containing gases at controlled rates through shell pipes into the free kiln space in that region of the heating-up zone defined by a point along the length of the heating-up zone where ignitable particles of the solid reducing agent first appear and a second point before the reducing zone.

7 Claims, 2 Drawing Figures

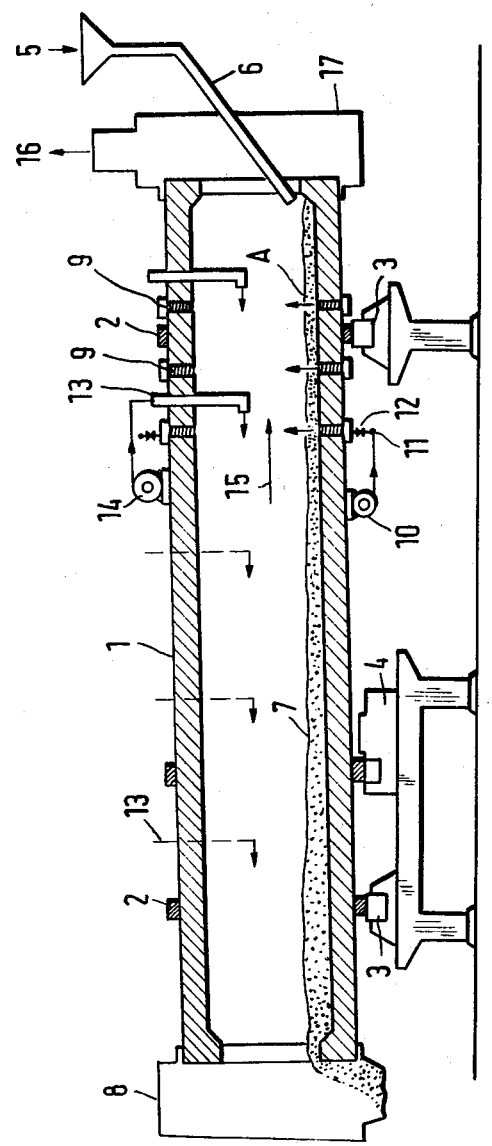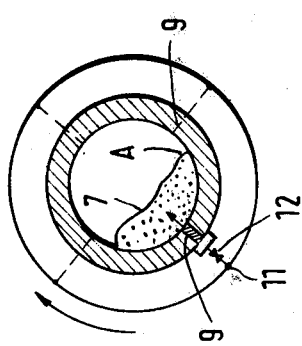

DIRECT-REDUCTION PROCESS CARRIED OUT IN A ROTARY KILN

This invention relates to a process of directly reducing iron oxide-containing materials to produce sponge iron in a rotary kiln by means of solid carbonaceous reducing agents having a high content of volatile combustible constituents, wherein oxygen-containing gases are injected at a controlled rate through shell pipes into the free kiln space and the charge is moved through the rotary kiln countercurrently to the flow of the kiln atmosphere.

To reduce iron ore in a rotary kiln, the latter is charged with a mixture of ore and reducing agent and as a result of the inclination and rotation of the kiln the mixture travels through the kiln countercurrently to the flow of the kiln atmosphere. The reducing agents may consist of virtually any of the solid carbonaceous energy carriers, from anthracite and coke breeze to lignite and brown coal.

Most of the solid carbonaceous reducing agents which can be employed contain combustible volatile constituents and e.g., in lignites and brown coals these constituents account for a substantial portion of the energy content. In the previous practice a major part of these combustible volatile constituents enter directly into the gas space of the rotary kiln from the heat-receiving surface of the charge as the latter is heated. Part of these constituents can be completely burnt in that gas space. For this purpose, air is supplied through shell pipes spaced along the length of the kiln. With larger kilns, this practice may result in uncontrolled high temperature in the free kiln space so that the surface of the charge and the inside surface of the kiln may be overheated and such overheating may result in a formation of disturbing crusts. Additionally, the energy content of the volatile constituents can be transferred to the charge only through the free kiln space. Owing to the limited heat capacity of the moving surface of the charge, the increased heat supply to the charge results in an accumulation of heat and this results in turn in a gasification of coal at the surface of the charge. As a result, the amount of solid reducing agent which is available for the combination with oxygen in the succeeding reducing step is decreased and the total energy requirement is increased because the carbon deficiency must be compensated by a supply of additional fresh coal. It has been found that as much as 20% of the quantity of carbon which is charged may be lost virtually without utilization as a result of such undesired gasification.

It is known to replace the injection of air through shell pipes into the free kiln space over the charge by an injection of gases into the rotary kiln through nozzle blocks which have outlet openings that are flush with the inside surface of the refractory lining or slightly protrude from said surface.

It is known from U.S. Pat. No. 3,182,980 to inject hydrocarbons into the charge in the reducing zone of the rotary kiln and to inject oxidizing gases through nozzle blocks into the free space of the rotary kiln through nozzle blocks spaced apart along the rotary kiln throughout the length thereof. The same concept has been described in German Offenlegungsschrift No. 2,146,133, where it is stated that the initial temperature of the reducing zone is at least about 975° C. It is known from German Auslegeschrift No. 10 32 550 to inject air or reducing gases into the charge when the latter has been heated up to the reduction temperature of 600° to 1000° C.

It is known from German Auslegeschrift No. 22 39 605 to blow air through nozzle blocks into the charge and into the free kiln space of a kiln which is charged with preheated pellets.

Measures related to the heating-up of the charge in a rotary kiln have not been disclosed in conjunction with any of these processes.

It is known from German Offenlegungsschrift No. 22 41 168 to inject oxygen-containing gases into a rotary kiln from the discharge end thereof at a high velocity of flow in a direction which is approximately parallel to the longitudinal axis of the kiln so that shell pipes are no longer required. It is stated as an additional measure that part of the oxygen-containing gases which are required can be injected into the charge and/or into the free gas space through nozzle blocks in as much as about one-fourth of the length of the rotary kiln next to the charging end and that the very good distribution of the oxygen supply results in a shortening of the heating-up zone. This practice affords advantages particularly in connection with relatively small rotary kilns because the flow conditions therein are improved by the elimination of the shell pipes. However, the flow conditions in larger rotary kilns are much less influenced by shell pipes. Additionally in large kilns the injection of air from the discharge end is limited by the long flow path of the injected air and by aerodynamical considerations. If oxygen-containing gases were injected in the heating-up zone through the charge by nozzle blocks only, then this would require a relatively large number of nozzle blocks so that the kiln structure would be weakened and a high expenditure would be required for the distribution. Otherwise there will be a risk of high dust losses caused by high velocities of flow of the gases in the charge, and a risk of a local cooling by the injected gases and of local overheating. An injection of oxygen-containing gases through nozzle blocks into the gas space results in a poorer mixing of the gases and in continual changes of temperature. As a result there is an uncontrolled combustion and overheating of the refractory lining.

It is an object of the invention to accelerate the heating of the charge in a rotary kiln in which solid carbonaceous reducing agents are employed and also to maximize the utilization of the combustible volatile constituents in the kiln and to provide a process for controlled combustion of the fuel without localized overheating.

This object is accomplished according to the invention in that oxygen-containing gases are injected at controlled rates through nozzle blocks into the charge disposed over nozzle blocks and oxygen-containing gases are injected at a controlled rate through shell pipes into the free kiln space in that region of the heating-up zone which begins at the point where ignitable particles of the solid reducing agents first appear and terminates before the reducing zone.

Ignitable particles of the reducing agent first appear in the lower part of the surface of the rolling charge. As the individual particles roll down on the surface of the rolling bed, the particles are heated by the hot kiln gases and reach the ignition temperature at a certain distance from the charging end, shortly before they are drawn into the rolling bed. At that point, the injection of oxygen-containing gases into the charge through nozzle blocks begins. As a result, those particles of the solid fuel which are ignitable or have been ignited are not cooled below the ignition temperature as they are drawn into the colder interior of the rolling bed but continue to burn in the interior of the rolling bed. The combustion which takes place is in the nature of a chain reaction, releasing additional amounts of volatile constituents. This combustion chain reaction soon spreads throughout the cross-section of the charge. The heat content of the volatile combustible constituents is thus fully utilized to heat the charge, and the heat exchange surface area which is available for a heat transfer is much increased. Additional nozzle blocks are provided at points which are spaced, e.g., 2.5 to 3.5 meters apart along the heating-up zone. This spacing is generally sufficient to enable an injection of oxygen into the bed at a sufficiently high rate without weakening the kiln structure. The nozzle blocks provided at each injection station form an annular series and extend radially and are spaced apart around the periphery of the kiln, the peripheal spacing amounting usually to 2.5 to 3.5 meters. Control mechanisms are provieed which ensure that in each annular series of nozzle blocks only those nozzle blocks which are disposed under the charge are supplied with oxygen-containing gases. Air is generally used as an oxygen-containing gas.

The term "nozzle block" describes but is not limited to a duct which extends through the kiln wall and the refractory lining of the rotary kiln and has an outlet opening which is flush with the inside surface of the refractory lining or protrudes or is recessed from said surface by a small distance. The nozzle blocks may consist of ceramic or metallic materials.

Radially extending shell pipes, which are spaced apart along the rotary kiln, are used to supply oxygen-containing gases into the free kiln space in the heating-up zone. The outlet openings of the shell pipes are disposed approximately at the center of the cross-section of the kiln and their axes are parallel to the longitudinal axis of the kiln. In this arrangement the outlet openings are not covered by the charge so that only one shell pipe is required in each blowing-in station. The reducing zone begins at that point of the length of the kiln where a considerable reduction of iron oxides to metallic iron occurs. A reduction of higher iron oxides to lower iron oxides occurs already in the heating-up zone. In order to advance the point of ignition or to accelerate the ignition, combustible substances, such as coke oven gas, refinery gas, natural gas or petroleum, can be added to the oxygen-containing gases which are injected through the nozzle blocks. The combustible substances which are added may supplement the combustible volatile constituents of the solid reducing agent if the same has only a low content of said constituents.

It is also possible to charge oil-containing roll scale into the kiln and to utilize the oil constituents of said roll scale as combustible volatile constituents for heating up the charge.

According to a preferred feature of the invention, said region of the heating-up zone begins at a point where the reducing agent is at a temperature of about 300° C. and is terminated at a point where the charge is at a temperature of 800° to 950° C. As described hereinbefore, the lower temperature of the reducing agent is measured in the lower portion of the surface of the rolling bed formed by the charge, shortly before the point where the fuel particles are drawn into the rolling bed. The upper temperature is the average temperature of the entire rolling bed formed by the charge because the temperature in the rolling bed has been equalized to a considerable extent when that temperature is reached. The selection of that temperature range ensures that the charge will not be cooled by the injected gases in the lower temperature range and that substantially all volatile constituents will have been released in the upper temperature range.

According to a preferred feature, 40 to 70% of all oxygen introduced into the rotary kiln are injected into said region of the heating-up zone. This results in a particularly good heating-up rate.

According to a preferred feature, 10 to 60% of the oxygen injected into said region of the heating-up zone are blown into the charge through the nozzle blocks and the balance is injected into the free kiln space through the shell pipes. This results in a rapid heating and in a fairly complete combustion of the combustible gaseous constituents in the free kiln space.

According to a preferred feature, the oxygen-containing gases injected through the nozzle blocks into the first part of said range of the heating-up zone have such an oxygen content that a stoichiometric ratio of oxygen to the combustible volatile constituents evolved and to be burnt in that first part is obtained therein and oxygen-containing gases injected into a succeeding part of said region of the heating-up zone have a lower oxygen content such that a sub-stoichiometric ratio is obtained in that succeeding part. In dependence on a measurement of temperature, the extent to which the oxygen content is decreased is controlled so that no carbon is burnt. The beginning of said region of the heating-up zone is that end of said region which is nearer to the charging end. That part of said region of the heating-up zone in which oxygen injected through nozzle blocks is not in excess of that required for a stoichiometric ratio is adjacent to that portion of the bed where the same has an average temperature of 600° to 700° C. This ensures a high utilization of the volatile constituents in the combustion whereas a direct combustion of solid carbon is substantially avoided.

EXAMPLE 1

A rotary kiln which had an inside diameter of 0.80 m and a length of 12.00 m was charged with brown coal having a moisture content of 20% together with ore pellets containing 67% Fe. The $C_{fixed}$-to-Fe ratio amounted to 0.42. The rotary kiln was operated without a supply of extraneous heat.

On a dry basis, the coal had the following analysis: 44% $C_{fixed}$, 50% volatile constituents, and 6% ash. In an operation in which air war supplied only through air pipes, a metallization of 94% was achieved at a throughput of 500 kg pellets per hour. The exhaust gas from the rotary kiln had a temperature of about 950° C. and the following composition in %: 19 $CO_2$, 0.5 $O_2$, 6 CO, 5 $H_2$, 0.5 $CH_4$, balance $N_2$.

The length of the heating-up zone was about 25% of the length of the kiln. When a 50% share of the total air which was supplied into the kiln was supplied in the heating-up zone and 50% of said share were supplied through nozzle blocks and 50% through air pipes, the same metallization was obtained under the following operating conditions:

| | |
|---|---|
| Pellet-charging rate | 650 kg/h |
| $C_{fixed}$-to-Fe ratio | 0.30 |
| Exhaust gas temperature | 800° C. |

| | |
|---|---|
| -continued | |
| composition of exhaust gas (%) | 20 CO$_2$, 0.5 O$_2$, 5 CO + H$_2$, 0 CH$_4$, balance N$_2$ |

In both cases, the length of the heating-up zone was about 25% of the length of the kiln.

EXAMPLE 2

A rotary kiln which had an inside diameter of 3.14 m and a length of 50 m was charged with ore pellets and brown coal having a moisture content of 10%. The C$_{fixed}$/Fe ratio amounted to 0.45. On a dry basis, the coal had the following analysis: 40% fixed, 25% volatile constituents and 35% ash.

During a first run the kiln was operated without air supply through nozzle blocks, 8 tons of pellets per hour were fed, the metallization was above 90%, the specific air consumption was 2100 standard cubic meters per ton of ore pellets, the mean temperature difference between gas and solid charge in the heating-up zone was about 300° C. and a reduction temperature of 900° C. was obtained after 30 m length of the kiln. The carbon consumption in the kiln was about 15%.

During a second run the kiln was operated with air supply through nozzle blocks, whereby 25% of the air which was supplied into the heating-up zone (10% of the total air which is supplied into the kiln) were supplied through nozzle blocks into the charge in the heating-up zone. 10 tons of pellets per hour were fed, the metallization was above 90%, the specific air consumption was 1850 standard cubic meters per ton of ore pellets, the mean temperature difference between gas and solid charge in the heating-up zone was about 150° C. and a reduction temperature of 900° C. was obtained after 20 m length of the kiln. The carbon consumption in the kiln was about 7%.

BRIEF DESCRIPTION OF THE DRAWINGS

The attached FIG. 1 shows schematically a longitudinal section of a typical rotary kiln which can be used in the processes of this invention. According to FIG. 1 there is a rotary furnace 1 suspended on curved rails 2 for rotary movement. Curved rails 2 are supported by rail supports 3. The rotary furnace 1 is rotated by driving mechanism 4 consisting of a motor and a ring gear. The charge 5 consisting of iron-oxides, solid carbonaceous material and eventually sulfur-binding material is charged through supply conduit 6 into the charging end of the kiln 1. The bed 7 of the charge travels through the kiln 1 and is discharged from the discharge end of the kiln and head 8. In the heating-up zone of the kiln 1 there are provided annular series of nozzle blocks 9. Air is supplied by the blower 10 to an annular supply conduit 11 and from this to nozzle blocks 9 which are disposed under the solid charge 7. The air supply to those nozzle blocks 9 which are disposed under the charge 7 is performed by opening their respective valves 12. The valves 12 of nozzle blocks 9 which are not disposed under the solid charge 7 are closed. The air supply to the other annular series of nozzle blocks is not shown. In the heating-up zone there are provided additionally shell pipes 13 which are supplied with air by the blower 14 constantly. Only one blower and supply is shown. In the reduction zone there are disposed further shell pipes 13 which are shown by dotted lines. The kiln atmosphere flows in the direction of arrow 15. The discharge orifices of shell tubes 13 can be disposed against or in the direction of flow of the kiln atmosphere. The waste gas 16 is sucked off from head 17. Ignitable particles of the solid carbonaceous reducing agent appear at point A in the heating-up zone. About at that point the injection of air through the bed 7 starts through the nozzle blocks 9 of the first annular series of nozzle blocks and is continued in the following annular series of nozzle blocks 9. The reducing zone begins some distance behind the last annular series of nozzle blocks.

FIG. 2 shows a schematic cross section through the first annular series of nozzle blocks 9 showing four nozzle blocks 9 from which three are shown by dotted lines only. These three nozzle blocks 9 are closed and supply no air into the kiln whereas the fully shown nozzle block 9 is open and supplies air into the bed 7. Ignitable particles of the solid carbonaceous reducing agent appear first in the lower part of the surface of the rolling bed 7. This point is marked as A.

Both figures and the position of nozzle blocks and shell tubes are not shown true in size but only schematically.

The advantages afforded by the invention reside in that the length of the heating-up zone of the rotary kiln is greatly reduced and, as a result, either the throughout rate of a given kiln is increased or a smaller kiln may be used for a given throughput rate. Moreover the difference between the gas temperature and the bed temperature is minimized, and the exhaust gas temperature is also heat to a minimum. The lower heat content per unit of volume reduces the danger of a formation of crusts and increases the durability of the refractory lining. The total energy consumption is much reduced because the heat content of the volatile combustible constituents of the solid fuel is utilized to a large extent, the gas temperature in the free kiln space and consequently in the exhaust gases is reduced, and the direct gasification of carbon on the bed is decreased since the accumulation of heat which would otherwise occur is avoided.

We claim:

1. In a process for preparing sponge iron by directly reducing an iron oxide-containing material with the use of solid carbonaceous reducing agents having a content of volatile combustile constituents in a rotary kiln said kiln having a heating-up zone in which the solid charge of iron oxide and reducing agent is heated to approximately the reduction temperature through which kiln the kiln atmosphere and the solid charge material of iron oxide-containing material and reducing agent are countercurrently passed, and wherein oxygen-containing gas is injected at a controlled rate through shell pipes into the free kiln space, the improvement which comprises injecting oxygen-containing gas at controlled rates through nozzle blocks into charge material disposed over said nozzle blocks at that horizontal region of the heating-up zone of which is defined by a point along the length of said heating-up zone where ignitable particles of the solid reducing agent first appear and a second point along the length of said heating-up zone before the point at which the reducing zone begins and injecting oxygen-containing gas at controlled rates through shell pipes into the free kiln space of the heating-up zone.

2. A process according to claim 1 wherein said region of the heating-up zone begins at a point where the reducing agent is at a temperature of about 300° C. and terminates at a point where the charge is at a temperature of 800° to 950° C.

3. A process according to claim 1 wherein 40 to 70% of the entire oxygen introduced into the rotary kiln is introduced into said region of the heating-up zone.

4. A process according to claim 1 wherein 10 to 60% of the oxygen introduced into said region of the heating-up zone is introduced into the charge through nozzle blocks and the balance is injected through shell pipes into the free kiln space.

5. A process according to claim 1 wherein the oxygen introduced into said region of said heating-up zone is introduced at a plurality of points along the length of said region, the oxygen-containing gas introduced at the first portion has such an oxygen content that a stoichiometric ratio of oxygen to combustible volatile constituents evolved from said solid reducing agent to be burnt in the first portion of said horizontal region is obtained and the oxygen content of the oxygen-containing gas introduced into a succeeding portion of said horizontal region has a lower oxygen content so that a substoichiometric ratio of oxygen to evolved combustible constituents to be burnt is obtained.

6. A process according to claim 1 wherein the solid carbonaceous reducing agent has at least 25 percent by weight volatile combustible constituents.

7. A process according to claim 6 wherein said solid carbonaceous reducing agent has 25 to 50 weight percent volatile combustible constituents.

* * * * *